(12) United States Patent
Mellor

(10) Patent No.: US 11,716,792 B2
(45) Date of Patent: Aug. 1, 2023

(54) CONDUCTIVE PATTERN SHEET, GLAZING HAVING THE SAME, VEHICLE HAVING THE GLAZING, METHOD OF MANUFACTURING THE SHEET AND METHOD OF MANUFACTURING THE GLAZING

(71) Applicant: Pilkington Group Limited, Lancashire (GB)

(72) Inventor: Leigh Francis Mellor, St Helens (GB)

(73) Assignee: PILKINGTON GROUP LIMITED, Lancashire (GB)

( * ) Notice: Subject to any disclaimer, the term of this patent is extended or adjusted under 35 U.S.C. 154(b) by 435 days.

(21) Appl. No.: 16/768,226

(22) PCT Filed: Nov. 30, 2018

(86) PCT No.: PCT/GB2018/053486
§ 371 (c)(1),
(2) Date: May 29, 2020

(87) PCT Pub. No.: WO2019/106389
PCT Pub. Date: Jun. 6, 2019

(65) Prior Publication Data
US 2020/0296805 A1 Sep. 17, 2020

(30) Foreign Application Priority Data
Nov. 30, 2017 (GB) ...................................... 1719994

(51) Int. Cl.
*H05B 3/86* (2006.01)
*B32B 17/10* (2006.01)
(52) U.S. Cl.
CPC ......... *H05B 3/86* (2013.01); *B32B 17/10036* (2013.01); *B32B 17/10174* (2013.01);
(Continued)

(58) Field of Classification Search
CPC ................ H05B 3/86; H05B 2203/007; H05B 2203/011; H05B 2203/013;
(Continued)

(56) References Cited

U.S. PATENT DOCUMENTS 4,964,068 A 10/1990 Matsushita et al.
5,182,431 A 1/1993 Koontz et al.
(Continued)

FOREIGN PATENT DOCUMENTS

CN 1229515 A 9/1999
CN 1878435 A 12/2006
(Continued)

OTHER PUBLICATIONS

Search Report dated May 10, 2018 by the Intellectual Property Office in Great Britain in counterpart British Patent Application No. 1719994.4, 4 pgs.
(Continued)

*Primary Examiner* — Shawntina T Fuqua
(74) *Attorney, Agent, or Firm* — Buchanan Ingersoll & Rooney PC

(57) ABSTRACT

The invention concerns a conductive pattern sheet for use in a glazing, comprising a substrate, a conductive pattern arranged on the substrate, wherein the conductive pattern comprises first and second busbars arranged at opposing edges of the conductive pattern for connecting a power supply thereto, a plurality of conductive lines each conductive line arranged between the first and second busbars, wherein at least a portion of the plurality of conductive lines is configured to have a transition region wherein a change from a first resistance per unit length (R1) at a first end of the transition region to a second resistance per unit length (R2) at a second end of the transition region occurs over a predetermined length (L) of the transition region wherein a
(Continued)

rate of change of resistance per unit length (R1-R2)/L is from 1 to 16,000 ohms per centimetre squared and the substrate is a polymer sheet.

20 Claims, 4 Drawing Sheets

(52) U.S. Cl.
CPC .. *H05B 2203/007* (2013.01); *H05B 2203/011* (2013.01); *H05B 2203/013* (2013.01); *H05B 2203/016* (2013.01); *H05B 2203/017* (2013.01); *H05B 2203/031* (2013.01)

(58) Field of Classification Search
CPC ........ H05B 2203/016; H05B 2203/017; H05B 2203/031; H05B 2203/037; B32B 17/10036; B32B 17/10174
See application file for complete search history.

(56) References Cited

U.S. PATENT DOCUMENTS

| | | | |
|---|---|---|---|
| 5,824,993 | A | 10/1998 | Chrysochoos et al. |
| 6,166,620 | A | 12/2000 | Inuzuka et al. |
| 2002/0135569 | A1 | 9/2002 | Chen |
| 2004/0065651 | A1 | 4/2004 | Voeltzel |
| 2006/0157462 | A1* | 7/2006 | Weiss ............... H05B 3/86 219/203 |
| 2006/0278631 | A1 | 12/2006 | Lee et al. |
| 2008/0099456 | A1 | 5/2008 | Schwenke et al. |
| 2008/0318011 | A1 | 12/2008 | Chaussade et al. |
| 2009/0188904 | A1 | 7/2009 | Schwerer et al. |
| 2011/0017719 | A1 | 1/2011 | Choi et al. |
| 2011/0042370 | A1 | 2/2011 | Choi et al. |
| 2011/0089160 | A1 | 4/2011 | Kuriki |
| 2012/0196029 | A1* | 8/2012 | Nelson ............... H05B 3/86 118/696 |
| 2014/0362434 | A1 | 12/2014 | Schmitz et al. |
| 2015/0343884 | A1 | 12/2015 | Rousselet et al. |
| 2016/0006107 | A1 | 1/2016 | Baranski |
| 2016/0174295 | A1 | 6/2016 | Klein et al. |
| 2016/0311402 | A1 | 10/2016 | Suetsugu et al. |
| 2016/0374150 | A1 | 12/2016 | Guillaume et al. |
| 2017/0080490 | A1 | 3/2017 | Tsugimoto |
| 2017/0291398 | A1 | 10/2017 | Chamberlain et al. |
| 2018/0098386 | A1* | 4/2018 | Masschelein ..... B32B 17/10036 |
| 2018/0162771 | A1 | 6/2018 | Fujii |

FOREIGN PATENT DOCUMENTS

| | | | |
|---|---|---|---|
| CN | 101283626 | A | 10/2008 |
| CN | 104081876 | A | 10/2014 |
| CN | 104703794 | A | 6/2015 |
| CN | 104966551 | A | 10/2015 |
| CN | 105144471 | A | 12/2015 |
| CN | 105409324 | A | 3/2016 |
| CN | 105981473 | A | 9/2016 |
| CN | 106463202 | A | 2/2017 |
| CN | 106794677 | A | 5/2017 |
| CN | 107097489 | A | 8/2017 |
| EP | 1908584 | A1 | 4/2008 |
| FR | 2590692 | A1 | 5/1987 |
| GB | 2043409 | A | 10/1980 |
| JP | H2165591 | | 6/1990 |
| JP | 2008523566 | | 7/2008 |
| JP | 4722315 | B2 * | 7/2011 ....... B32B 17/10036 |
| JP | 2016-221811 | A | 12/2016 |
| JP | 2017204388 | A | 11/2017 |
| KR | 10-2009-0099502 | A | 9/2009 |
| WO | 2006063064 | A1 | 6/2006 |
| WO | 2017/026318 | A1 | 2/2017 |

OTHER PUBLICATIONS

International Search Report (PCT/ISA/210) dated Feb. 18, 2019, by the British Patent Office as the International Searching Authority for International Application No. PCT/GB2018/053486, 2 pgs.

Written Opinion (PCT/ISA/237) dated Feb. 18, 2019, by the British Patent Office as the International Searching Authority for International Application No. PCT/GB2018/053486, 5pgs.

Allowance Notice (Notification to Grant Patent Right for Invention) dated Mar. 23, 2022, by the State Intellectual Property Office of People's Republic of China in corresponding Chinese Patent Application No. 201880083420.7 and an English Translation of the Allowance Notice. (6 pages).

English Translation of the Office Action (Notification of the First Office Action) dated Nov. 3, 2021, by the National Intellectual Property Administration, P. R. China in corresponding Chinese Patent Application No. 201880083420.7. (6 pages).

Notice of Reasons for Refusal issued in Japanese Patent Application No. 2020-529537, dated Oct. 18, 2022, with English Translation (7 pages).

* cited by examiner

CONDUCTIVE PATTERN SHEET, GLAZING HAVING THE SAME, VEHICLE HAVING THE GLAZING, METHOD OF MANUFACTURING THE SHEET AND METHOD OF MANUFACTURING THE GLAZING

FIELD OF THE INVENTION

The invention concerns a conductive pattern sheet, a glazing having the same, a vehicle having the glazing, a method of manufacturing the sheet and a method of manufacturing the glazing. Uses of the conductive patterned sheet in a glazing include a vehicle window, a refrigerator door, a window for a building or digital signage.

Conductive patterned sheets are known as a component of a glazing providing a network of wires, printed or etched conductive lines arranged in a laminated glass to raise a temperature of the glazing by resistance heating. For example, a glazing of a vehicle is thereby defogged or defrosted to ensure a field of view of an occupant of the vehicle.

PRIOR ART DOCUMENTS

U.S. Pat. No. 5,824,993A (Chrysochoos) discloses heating conductors of varying electrical resistance to achieve greater heat generation at desired locations of an automobile glazing unit. Heating conductors may be formed from conductive ceramic material having a thickness, i.e. height, 0.005 to 0.007 inches (127 to 178 μm) and width 0.010 to 0.060 inches (254 to 1,524 μm). Thinner heating sections have width 0.005 to 0.020 inches (127 to 508 μm) to achieve a desired power density.

US20110017719A1 (Choi) discloses a heating element comprising (a) a resin film; (b) a conductive heating pattern disposed on at least one side of the resin film, a width of conductive line of the pattern being 100 μm or less, an opening ratio of the pattern being 70% to 99%; (c) busbars that are disposed on both ends of the conductive heating pattern; (d) a power portion that is connected to the busbars; (e) a transparent substance that is provided on at least one side of the resin film on which the conductive heating pattern is formed, preferably by printing. Height of conductive line range is 1 to 100 μm. Regularity of the pattern is minimized so as not to impair optical properties by diffraction and interference. Heating power is calculated from width and height of conductive line and opening ratio of conductive heating pattern.

US2011/0089160A1 (Kuriki) discloses a conductive film suitable for use in a transparent heating element. A conductor of a first conductive film has a mesh pattern which has a plurality of lattice cross points (intersections) formed by a plurality of first metal nanowires and a plurality of second metal nanowires. The conductor between intersections is formed in a wave-like shape having at least one curve.

US2016311402A1 (Suetsugu) discloses a heating plate, comprising a pair of glass plates, a conductive pattern sheet disposed between two glass plates, defining a plurality of opening areas and a joint layer disposed between the sheet and a least one of the pair of glass plates. The sheet comprises a plurality of connection elements which extend between two branch points to define opening areas. A ratio of straight line connection elements to a total number of connection elements is less than 20%. Patterns are disclosed comprising thin conductive wire having width not less than 1 μm and not more than 20 μm. Such thin conductive wires may be formed of a patterned copper film.

GB2043409B (Paudice) discloses a heated window pane for a vehicle comprising electrically conductive strips produced by screen-printing of inks, containing a conductive metal, such as silver. Local power dissipation by a strip is changed by inks having different resistivities due to a different silver percentage, although the cross-section of each strip remains constant along its length.

US20120196029A1 (Nelson) discloses a plastic window assembly in a vehicle comprising a plastic panel and conductive heater grid comprising grid lines printed thereon using conductive ink. Height and/or width, and hence the volume, of the grid lines can be varied to control resistivity over the length of a grid line. Grid lines may have a larger width near a busbar adjacent either end and a taper to a smaller width in the centre. Grid lines designed for a glass window may not necessarily be efficient at defrosting a plastic window.

US20090188904A1 (Schwerer) discloses a heater circuit for a structure such as a radome for an antenna. The heater circuit comprises resistive elements to provide energy as heat when an electrical current is passed through them. The width of resistive elements may be relatively wider in an edge region than in a central portion of the radome, i.e. tapered.

US20080099456A1 (Schwenke) discloses a vehicle window having a heater grid formed of conductive ink. The heater grid comprises a plurality of grid lines, wherein height, width and hence volume of the grid lines can be varied to control resistivity over the length of the grid lines to alleviate hotspots. Larger width near a busbar may taper to a smaller width in the centre of the grid lines.

US20040065651A1 (Voeltzel) discloses a windshield having electrically conductive coating segments and varying coating thickness and/or width of coating segments to vary cross-sectional area of the coating segments, thereby to increase the temperature of selected portions of the windshield.

U.S. Pat. No. 4,964,068A (Matsushita) discloses a vehicle glass window having defogging heater wires formed by screen printing between busbars at both sides of the window. A central high-heating area has intermediate-heating areas at both sides thereof, and low-heating areas extending along the busbars. Conductor widths of the high-, intermediate- and low-heating areas are increased in the order named, and a thickness of the high-heating area is set to be smaller than a thickness of the two other areas. Straight line contours connect stepped conductor contours on both sides of boundary lines of heating areas.

FR2590692A1 (Roselli) discloses a car window having a heating network made by screen-printing. The heating network comprises conductors having greater width in zones with a view to dissipating less energy therein than elsewhere.

The present invention has an objective to provide an alternative glazing, not involving printing conductive inks on glass or rigid plastic panels, providing effective defogging or defrosting of a window, without undesirable hotspots or undesirable optical effects due to gridlines.

The present inventor has found a problem that in a conductive pattern sheet having a plurality of heating zones of variable power density, comprising conductive lines of different width or height, undesirable optical effects occur at a zone boundary. The inventor has found two undesirable optical effects: (a) poor visual appearance, because a sharp change in width or height of conductive line is noticeable as a feature and (b) optical distortion, known as "shimmer" or "heat haze", because known objects viewed in transmission through the conductive pattern sheet appear distorted, due to optical refraction.

It is an object of the present invention to solve this problem by providing a conductive pattern sheet which reduces or eliminates the undesirable optical effects.

SUMMARY OF THE INVENTION

The present invention provides, in a first aspect, a conductive pattern sheet according to claim 1.

According to the first aspect, the invention provides a conductive pattern sheet for use in a glazing, comprising: (a) a substrate; (b) a conductive pattern arranged on the substrate; wherein the conductive pattern comprises (c) first and second busbars arranged at opposing edges of the conductive pattern for connecting a power supply to the conductive pattern; (d) a plurality of conductive lines, each conductive line arranged between the first and second busbars; (e) at least a portion of the plurality of conductive lines is configured to have a transition region, wherein a change from a first resistance per unit length (R1) at a first end of the transition region to a second resistance per unit length (R2) at a second end of the transition region occurs over a predetermined length (L) of the transition region; (f) wherein a rate of change of resistance per unit length (R1-R2)/L is in a range 1 to 16,000 ohms per centimetre squared and (g) the substrate is a polymer sheet.

The predetermined length (L) is non-zero so a rate of change in resistance per unit length is gradual. The rate of change of resistance per unit length has at least one value.

Preferably the conductive pattern comprises an etched conductive material. Preferably the etched conductive material is made by lithographic etching of a layer of a conductive material, having resistivity in a range 1 to 15 µohm.cm, more preferably 1.7 to 5 µohm.cm, most preferably copper, initially covering part of a surface of the substrate.

Preferably the conductive line in the transition region comprises variable width or height or cross-sectional area or resistivity or a combination thereof.

Preferably the conductive line in the transition region has linear sides or curved sides or a combination thereof.

Preferably a rate of change of resistance per unit length in the transition region is linear or a parabolic function.

Preferably the rate of change of resistance per unit length is in a range from 3 to 15,000 ohms per centimetre squared, preferably from 5 to 12,000 ohms per centimetre squared, more preferably from 8 to 10,000 ohms per centimetre squared.

Preferably a rate of change of width or height or cross-sectional area or resistivity is linear or a parabolic function.

Preferably the rate of change of width or height is in a range from 1 to 540,000 µm per centimetre, preferably from 5 to 77,000 µm per centimetre, more preferably from 10 to 65,000 µm per centimetre.

Preferably the predetermined length (L) of the transition region is in a range from 1 to 10,000 µm, preferably from 10 to 5,000 µm, more preferably from 50 to 1,000 µm.

According to a second aspect, the invention provides a glazing comprising a first ply of glazing material, a ply of interlayer material arranged on the first ply of glazing material, a second ply of glazing material arranged on the ply of interlayer material, a conductive pattern sheet according to the invention arranged between the ply of interlayer material and the second ply of glazing material.

Preferably in the glazing a second ply of interlayer material is arranged between the conductive pattern sheet and the second ply of glazing material.

According to a third aspect, the invention provides a vehicle comprising a glazing according to the second aspect wherein the transition region is in a vision zone of the glazing. Preferably the glazing is a windscreen of the vehicle and the transition region is in a vision zone for a driver of the vehicle.

According to a fourth aspect, the invention provides a method of manufacturing a conductive pattern sheet comprising steps: (a) providing a substrate; (b) arranging a conductive pattern on the substrate, wherein a method of manufacturing the conductive pattern comprises steps: (c) arranging first and second busbars at opposing edges of the conductive pattern for connecting a power supply to the conductive pattern, (d) arranging a plurality of conductive lines, each conductive line arranged between the first and second busbars, (e) configuring at least a portion of the plurality of conductive lines to have a transition region wherein a change from a first resistance per unit length (R1) at a first end of the transition region to a second resistance per unit length (R2) at a second end of the transition region occurs over a predetermined length (L) of the transition region; (f) wherein a rate of change of resistance per unit length (R1-R2)/L is in a range 1 to 16,000 ohms per centimetre squared and (g) the substrate is a polymer sheet.

Preferably the method of manufacturing a conductive pattern sheet includes a step of further providing the conductive line in the transition region having variable width or height or cross-sectional area or resistivity or a combination thereof.

According to a fifth aspect, the invention provides a method of manufacturing a glazing, comprising steps: (a) providing a first ply of glazing material, (b) arranging a ply of interlayer material on the first ply of glazing material, (c) arranging a second ply of glazing material on the ply of interlayer material, (d) arranging a conductive pattern sheet according to claim 1 between the ply of interlayer material and the second ply of glazing material.

EFFECT OF THE INVENTION

The invention provides a conductive pattern sheet comprising a predetermined rate of change of resistance per unit length due to a change of width or height or cross-sectional area or resistivity of conductive lines. Surprisingly, a rate of change of resistance per unit length according to the invention significantly reduces refractive index change, but not power density. This surprising effect is not disclosed in the prior art, which fails to observe an interaction between optical performance and width, height, cross-sectional area or resistivity of conductive lines. Thus, the invention provides a conductive pattern sheet having a plurality of heating zones of variable power density and reduces or eliminates undesirable optical effects. An optical effect in use known as "shimmer", due to changed refractive index a polymer sheet, is avoided by configuring a rate of change of resistance per unit length in a transition region between adjacent heating zones of a conductive line.

wherein a change of resistance per unit length occurs due to width or height or cross-sectional area or resistivity of the conductive line, or a combination thereof.

Figure 1:
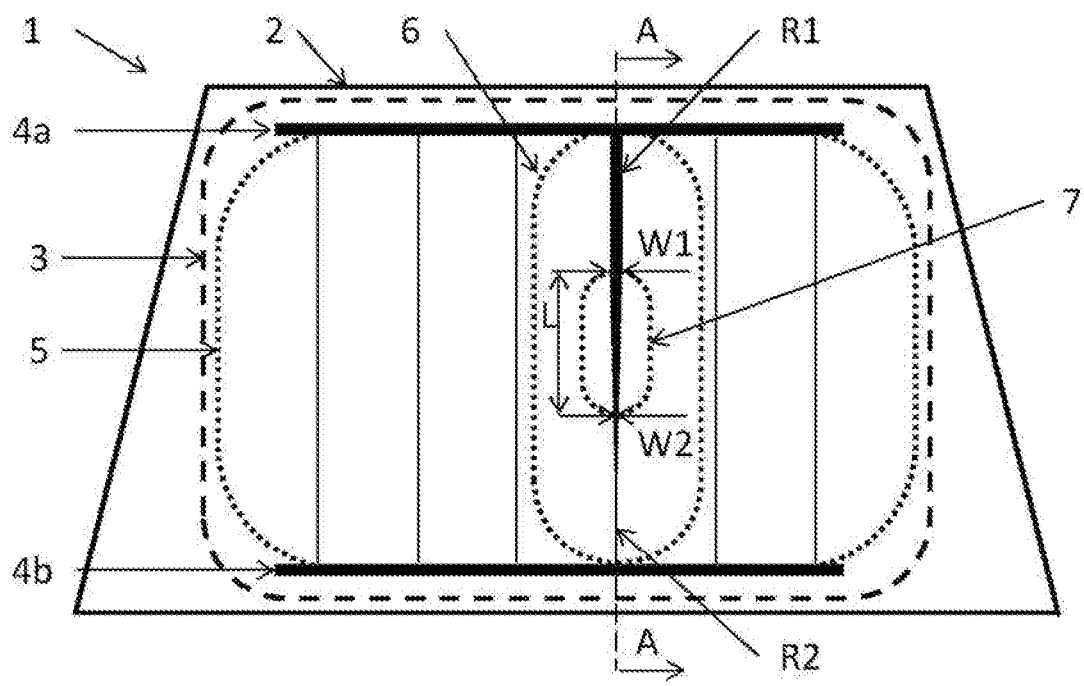
FIG. 1 is a plan view of a conductive pattern sheet (1) according to the invention comprising a substrate (2), a conductive pattern (3) arranged on the substrate, comprising at least a conductive line having a transition region (7)
Figure 2:
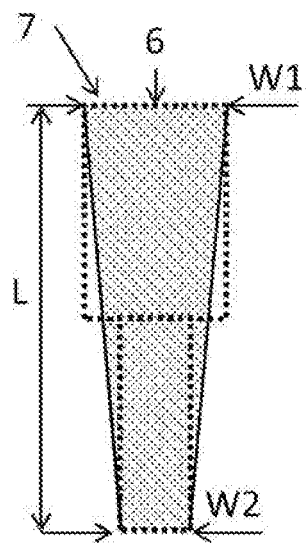

FIG. 2 is a close-up of FIG. 1 according to the invention, wherein the transition region comprises a linear change of width from W1 to W2. Dotted lines show how the conductive line would have been without the transition region (7).

Figure 3:
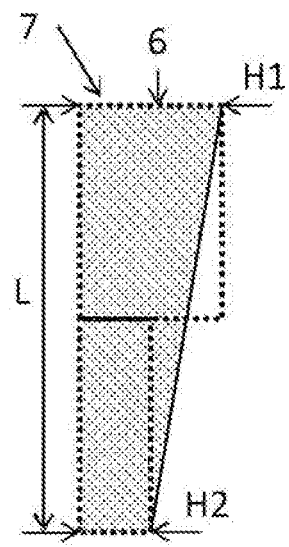

FIG. 3 is a cross-section on A-A in FIG. 1 according to the invention wherein the transition region (7) comprises a linear change of height from H1 to H2.

Figure 4:
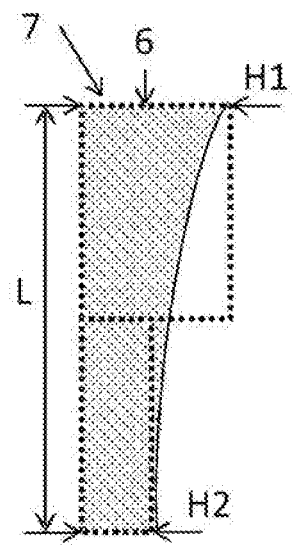

FIG. 4 is a cross-section on A-A in FIG. 1 according to the invention wherein the transition region (7) has a change of height according to a parabolic function, i.e. in a shape having a curved side.

Figure 5:
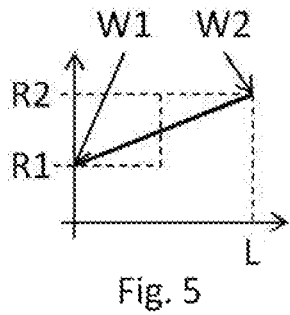

FIG. 5 is a graph of resistance per unit length (y axis) versus distance in a length direction (x axis). At a first end of a transition region (7), width is W1 and resistance per unit length is R1. At a second end of the transition region (7) of length L, width is W2 and resistance per unit length is R2. Bold line shows a linear rate of change of resistance per unit length according to the invention. Dotted line indicates abrupt change in the prior art.

Figure 6:
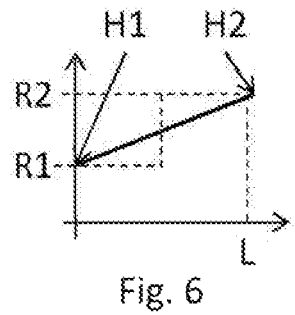

FIG. 6 is a graph of resistance per unit length (y axis) versus distance in a length direction (x axis). At a first end of a transition region (7), height is H1 and resistance per unit length is R1. At a second end of the transition region (7) of length L, height is H2 and resistance per unit length is R2. Bold line shows a linear rate of change of resistance per unit length according to the invention. Dotted line indicates abrupt change in the prior art.

Figure 7:
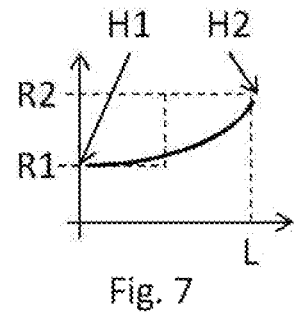

FIG. 7 is a graph of resistance per unit length (y axis) versus distance in a length direction (x axis). At a first end of a transition region (7), height is H1 and resistance per unit length is R1. At a second end of the transition region (7) of length L, height is H2 and resistance per unit length is R2. Bold line shows a parabolic function rate of change of resistance per unit length according to the invention. Dotted line is the prior art.

Figure 8:
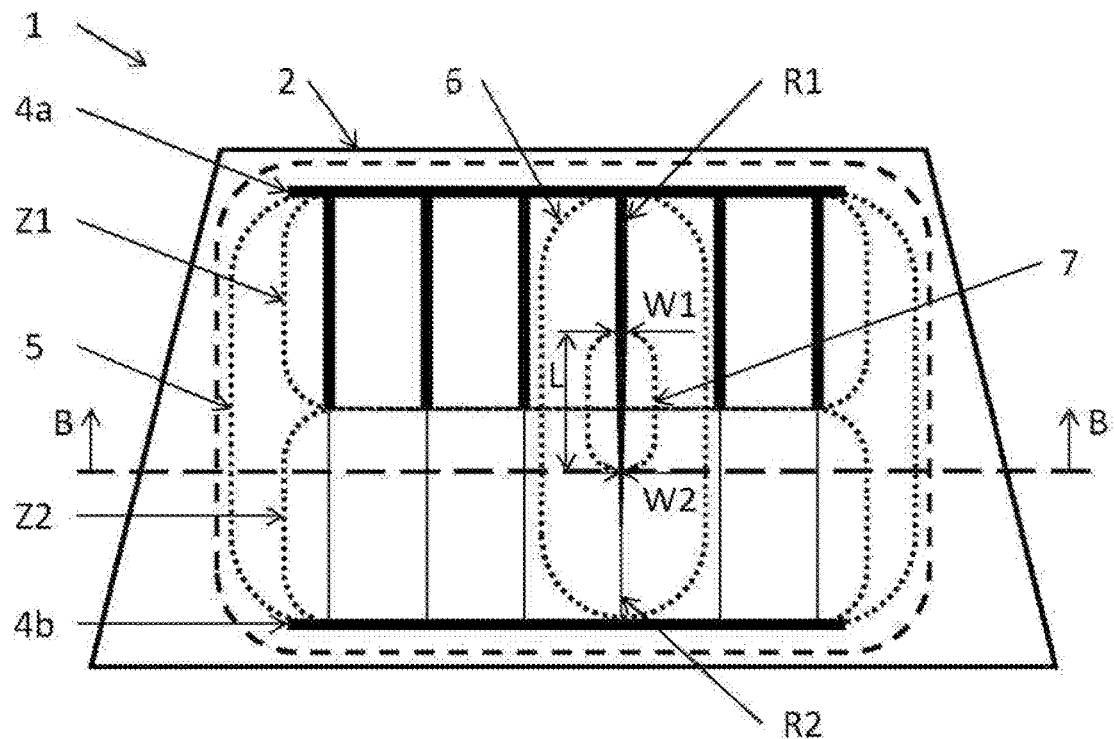

FIG. 8 is a plan view of a conductive pattern sheet (1) according to the invention, having a plurality of conductive lines (5), a portion (6) thereof having a transition region (7) in each conductive line of the portion (6) wherein a change of resistance per unit length occurs due to width or height or cross-sectional area or resistivity of conductive lines, or a combination thereof. The plurality of conductive lines (5) comprises heating zones Z1, Z2.

Figures 9, 10, 11:
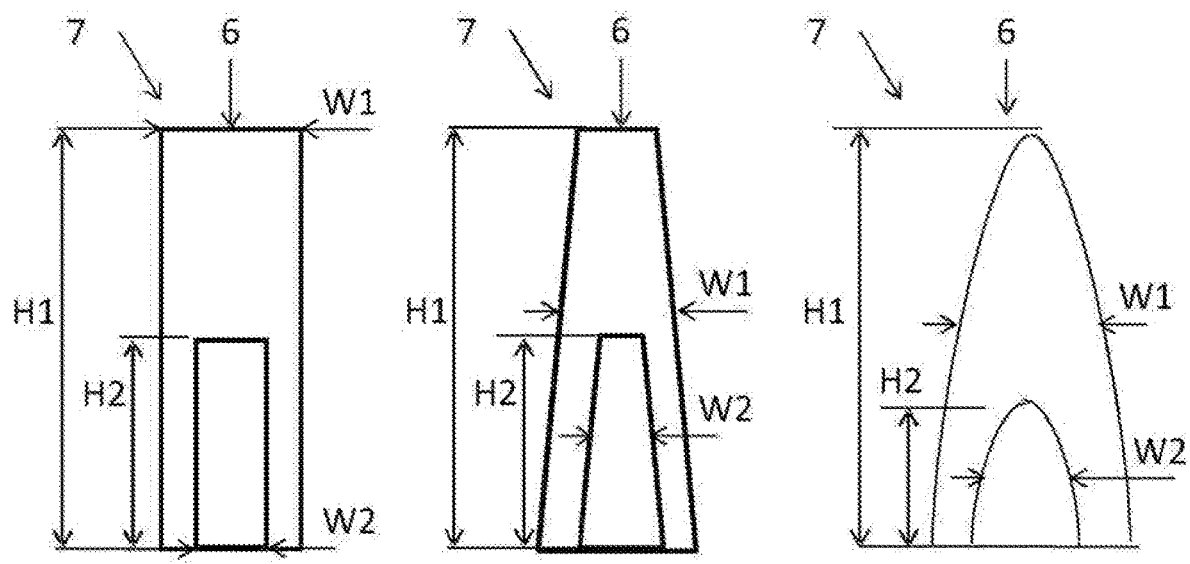

FIG. 9 is a cross-section on B-B in FIG. 8 according to the invention. The close-up shows a change in cross-sectional area wherein the sides are rectangular.

FIG. 10 is a cross-section on B-B in FIG. 8 according to the invention, wherein the sides of conductive lines are trapezoidal. At first and second ends of the transition region (7), trapezoidal sided conductive lines have average width W1, W2.

FIG. 11 is a cross-section on B-B in FIG. 8 according to the invention, wherein the sides of conducive lines are curved. At first and second ends of the transition region, curved sided conductive lines have average width W1, W2.

Figure 12:
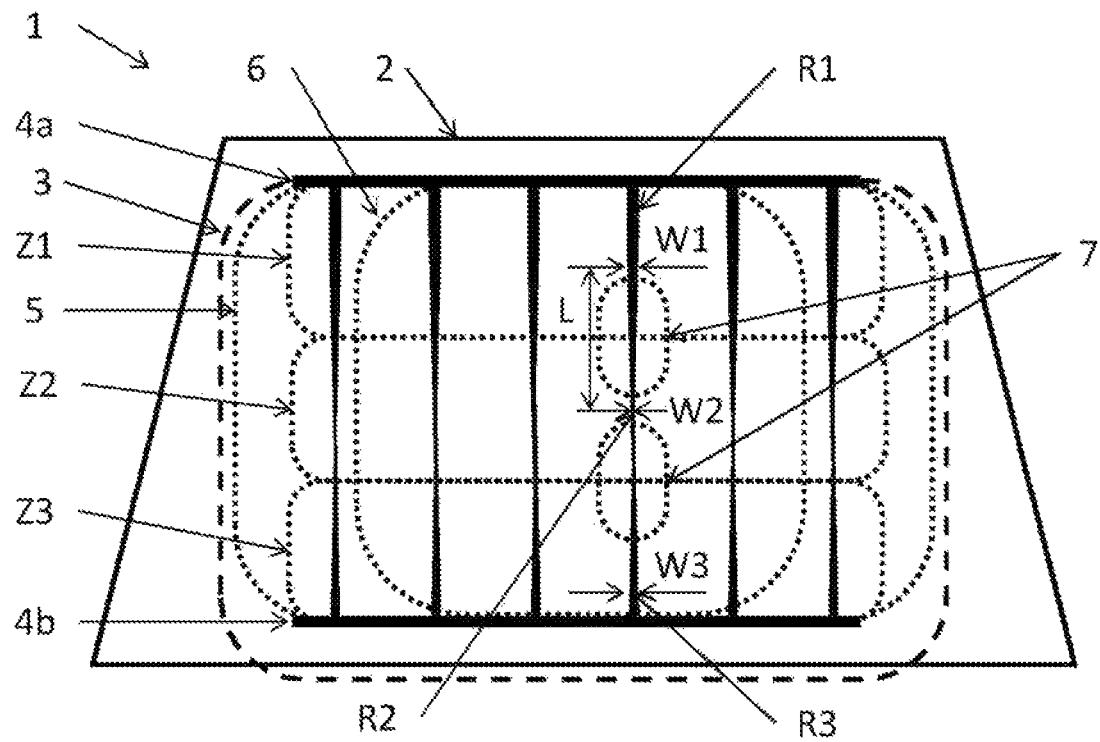

FIG. 12 is a plan view of a conductive pattern sheet (1), like FIG. 8, wherein the portion (6) comprises all conductive lines arranged between the busbars. Each conductive line comprises three heating zones (Z1, Z2, Z3). Resistance per unit length of conductive line (R1, R2, R3) changes gradually to the next in a transition region (7).

Figure 13:
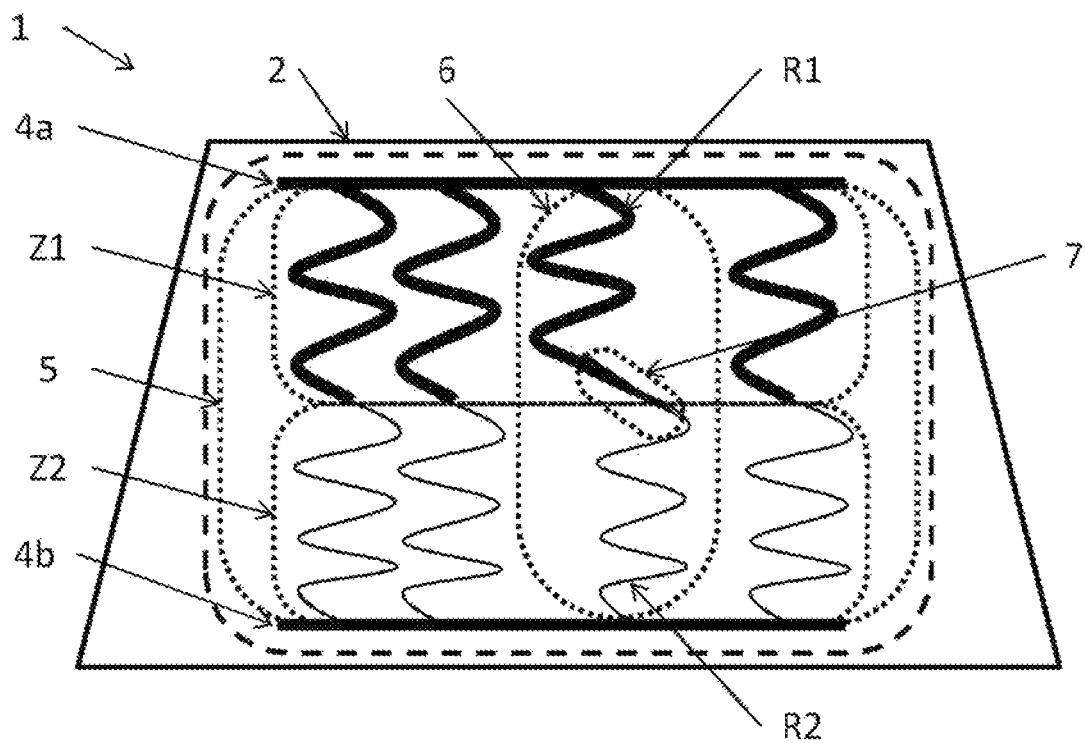

FIG. 13 is a plan view of a conductive pattern sheet (1) according to the invention wherein a plurality of conductive lines (5) comprises curved lines. Curved lines have a crimp ratio, i.e. line length divided by distance in a length direction between the busbars (4a, 4b).

Figure 14:
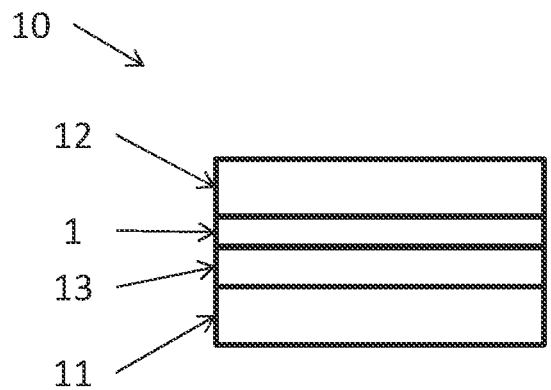
Figure 15:
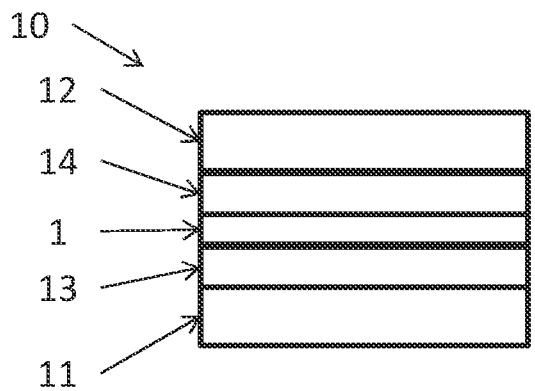

FIG. 14 and FIG. 15 are a glazing (10) in cross-section having one or two plies of interlayer material respectively.

Figure 16:
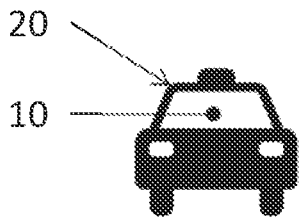

FIG. 16 is a vehicle (20) having a glazing (10).

Figure 17:
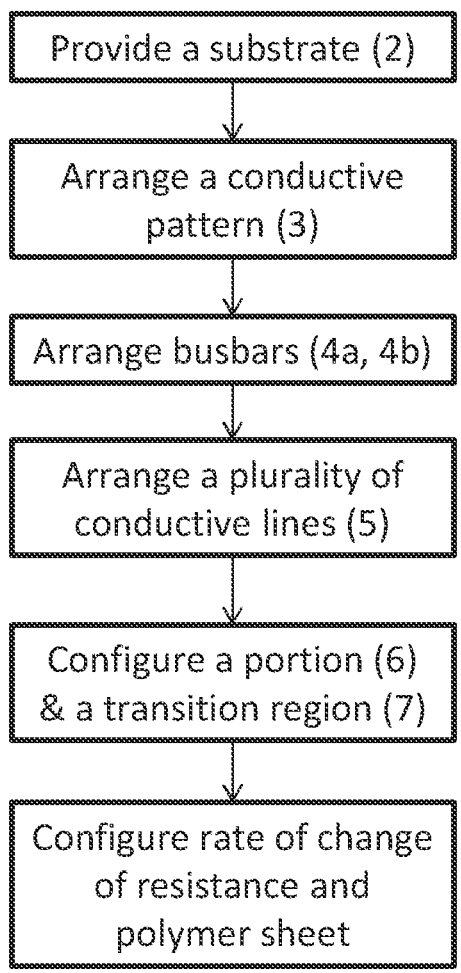
Figure 18:
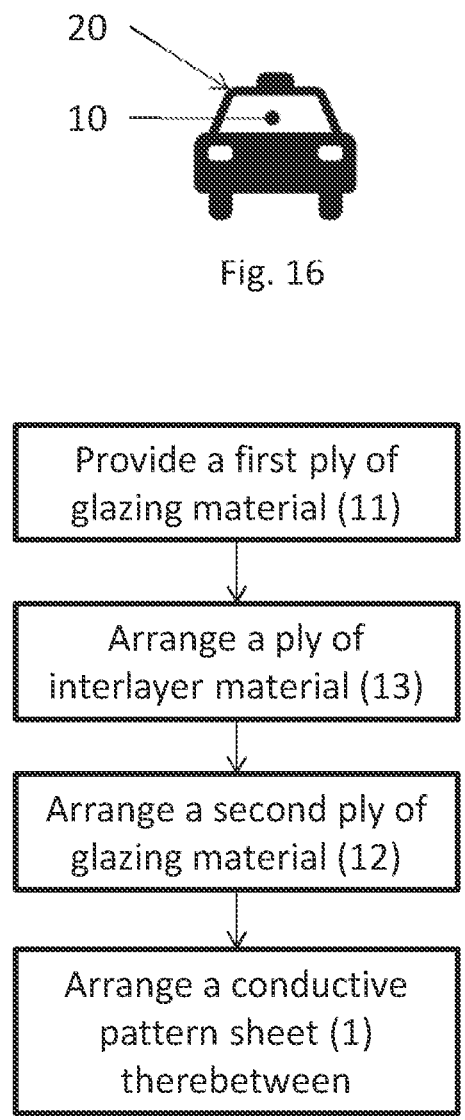

FIG. 17 and FIG. 18 are methods of manufacturing a conductive pattern sheet (1) and a glazing (10).

MODES FOR CARRYING OUT THE INVENTION

The following is a description with reference to the drawings of conductive pattern sheet (1) in an embodiment of the present invention.

Conductive Pattern Sheet

A conductive pattern sheet (1) for use in a glazing comprises a substrate (2). The substrate (2) is a polymer sheet, for example polyvinyl butyral (PVB).

A conductive pattern (3) is provided on a substrate (2) by lithographic etching of a layer of a conductive material, having resistivity in a range 1 to 15 μohm.cm, more preferably 1.7 to 5 μohm.cm, most preferably copper, initially covering at least part of a surface of the substrate (2).

The conductive pattern (3) comprises first and second busbars (4a, 4b) arranged at opposing edges of the conductive pattern (3) for connecting a power supply to the conductive pattern (3). Busbars (4a, 4b) may be made by lithographic etching as described above for the conductive pattern (3) and/or by applying to the conductive pattern (3) a preformed metal foil, preferably tinned metal foil for better soldering.

The conductive pattern (3) comprises a plurality of conductive lines (5) arranged between the first and second busbars (4a, 4b). The plurality of conductive lines (5) may be formed at the same time as the busbars (4a, 4b), so they are electrically connected and/or the plurality of conductive lines (5) is connected to the busbars (4a, 4b) by soldering.

At least a portion (6) of the plurality of conductive lines (5) is configured to have a transition region (7) wherein a change in resistance from a first resistance (R1) to a second resistance (R2) occurs over a predetermined length (L) of the transition region selected to control a rate of change of resistance per unit length.

Examples of conductive pattern sheets (1) for a first glazing comprising three heating zones, as shown in FIG. 12, were simulated. Heating zone Z2 is in a vision zone of the glazing where defrost function is desired. Heating zones Z1 and Z3 are respectively above and below the vision zone. In heating zones Z1 and Z3 demist function is desired.

Table 1 shows results of each heating zone simulated as a resistor. Table 2 shows results of each conductive line simulated as a resistor.

TABLE 1

| Each heating zone as a resistor, first glazing | | | | |
|---|---|---|---|---|
| | | Z1 | Z2 | Z3 |
| Length | (m) | 0.896 | 0.327 | 0.346 | 0.224 |
| Width | (m) | 1.251 | 1.251 | 1.251 | 1.251 |
| Area | (m2) | 1.121 | 0.409 | 0.433 | 0.280 |
| Voltage | (V) | 13.500 | 3.551 | 7.518 | 2.431 |
| Current | (A) | 46.039 | 46.039 | 46.039 | 46.039 |
| Resistance | (Ohm) | 0.293 | 0.077 | 0.163 | 0.053 |
| Power Density | (Wm-2) | | 400 | 800 | 400 |
| Power | (W) | 621.529 | 163.498 | 346.103 | 111.928 |

TABLE 2

Each conductive line as a resistor, first glazing

|  |  |  | Z1 | Z2 | Z3 |
|---|---|---|---|---|---|
| Resistivity | (ohm · m) | 1.80E−08 | 1.800E−08 | 1.800E−08 | 1.800E−08 |
| Crimp | (%) | 120% | 120% | 120% | 120% |
| Length | (m) | 1.0757 | 0.392 | 0.415 | 0.268 |
| Width (average) | (μm) | 9.50 | 13.171 | 6.585 | 13.171 |
| Height | (μm) | 12 | 12 | 12 | 12 |
| Area | (m2) | 1.14E−10 | 1.580E−10 | 7.902E−11 | 1.580E−10 |
| Resistance | (ohm) | 169.84 | 44.662 | 94.543 | 30.575 |
| Number of lines |  | 579 | 579 | 579 | 579 |
| Spacing | (mm) | 2.160 | 2.160 | 2.160 | 2.160 |
| R per unit length | (ohm/cm) |  | 1.139 | 2.279 | 1.139 |

Table 3 shows examples having transition length equal to 1 μm. Table 4 shows examples having transition length greater than 1 μm, namely 10 μm and 1 mm. Each table shows two transitions, i.e. six transition regions are simulated for the first glazing.

TABLE 3

Examples of transition length 1 μm, first glazing

| Transition length 1 μm |  | Z1-Z2 | Z2-Z3 |
|---|---|---|---|
| Change in width | (μm) | 6.59 | 6.59 |
| Rate of change width | (μm/cm) | 65853 | 65853 |
| Change of R per unit length | (ohm/cm) | 1.139 | 1.139 |
| Rate of change R p.u. length | (ohm/cm2) | 11,393 | 11,393 |

TABLE 4

Examples of transition length greater than 1 μm, first glazing

|  |  | Z1-Z2 | Z2-Z3 |
|---|---|---|---|
| Transition length 10 μm |  |  |  |
| Rate of change width | (μm/cm) | 6585 | 6585 |
| Rate of change R p.u. length | (ohm/cm2) | 1,139 | 1,139 |
| Transition length 1 mm |  |  |  |
| Rate of change width | (μm/cm) | 65.85 | 65.85 |
| Rate of change R p.u. length | (ohm/cm2) | 11.39 | 11.39 |

Examples of conductive pattern sheets (1) for a second glazing comprising three heating zones, as shown in FIG. 12, were simulated. Heating zone Z2 is in a vision zone of the glazing where defrost function is desired. Heating zones Z1 and Z3 are respectively above and below the vision zone where demist function is desired.

Table 5 shows results of each heating zone simulated as a resistor. Table 6 shows results of each conductive line simulated as a resistor.

TABLE 5

Each heating zone as a resistor, second glazing

|  |  | Z1 | Z2 | Z3 |
|---|---|---|---|---|
| Length | (m) | 1.115 | 0.200 | 0.800 | 0.115 |
| Width | (m) | 1.250 | 1.250 | 1.250 | 1.250 |
| Area | (m2) | 1.394 | 0.250 | 1.000 | 0.144 |
| Voltage | (V) | 13.500 | 1.476 | 11.811 | 0.212 |
| Current | (A) | 67.731 | 67.731 | 67.731 | 67.731 |
| Resistance | (Ohm) | 0.199 | 0.022 | 0.174 | 0.003 |
| Power Density | (Wm-2) |  | 400 | 800 | 100 |
| Power | (W) | 914.375 | 100.000 | 800.000 | 14.375 |

TABLE 6

Each conductive line as a resistor, second glazing

|  |  |  | Z1 | Z2 | Z3 |
|---|---|---|---|---|---|
| Resistivity | (ohm · m) | 1.80E−08 | 1.80E−08 | 1.80E−08 | 1.80E−08 |
| Crimp | (%) | 120% | 120% | 120% | 120% |
| Length | (m) | 1.338 | 0.240 | 0.960 | 0.138 |
| Width (average) | (μm) | 9.50 | 15.581 | 7.791 | 62.325 |
| Height | (μm) | 12 | 12 | 12 | 12 |
| Area | (m2) | 1.14E−10 | 1.870E−10 | 9.348E−11 | 7.479E−10 |
| Resistance | (ohm) | 211.263 | 23.10 | 184.84 | 3.32 |
| Number of lines |  | 1060 | 1060 | 1060 | 1060 |
| Spacing | (mm) | 1.179 | 1.179 | 1.179 | 1.179 |
| R per unit length | (ohm/cm) | 1.579 | 0.9627 | 1.9254 | 0.2407 |

Table 7 shows examples having transition length equal to 1 μm. Table 8 shows examples having transition length greater than 1 μm, namely 10 μm and 1 mm. Each table shows two transitions, i.e. six transition regions are simulated for the second glazing.

TABLE 7

Examples of transition length 1 μm, second glazing

| Transition length 1 μm | | Z1-Z2 | Z2-Z3 |
|---|---|---|---|
| Change in width | (μm) | 7.79 | 54.53 |
| Rate of change width | (μm/cm) | 77906 | 545344 |
| Change of R per unit length | (ohm/cm) | 0.9627 | 1.6847 |
| Rate of change R p.u. length | (ohm/cm2) | 9,627 | 16,847 |

TABLE 8

Examples of transition length greater than 1 μm, second glazing

| | | Z1-Z2 | Z2-Z3 |
|---|---|---|---|
| Transition length 10 μm | | | |
| Rate of change width | (μm/cm) | 7791 | 54534 |
| Rate of change R p.u. length | (ohm/cm2) | 962.7 | 1,684.7 |
| Transition length 1 mm | | | |
| Rate of change width | (μm/cm) | 77.91 | 545.34 |
| Rate of change R p.u. length | (ohm/cm2) | 9.627 | 16.847 |

Comparative example is second glazing transition region Z2-Z3, having a transition length 1 μm and rate of change of resistance per unit length 16,847 ohm/cm$^2$.

The above-mentioned conductive pattern sheets, except comparative example second glazing transition region Z2-Z3, are suitable for use in a windshield. The comparative example is unacceptable for a windshield due to shimmer. This unacceptable optical effect is believed to be due to a change in the refractive index of the polymer sheet caused by the high rate of change of resistance per unit length.

Glazing

A glazing (10) according to the invention comprises first and second plies of glazing material (11, 12). An example of a suitable glazing is float glass, preferably soda lime silica glass composition having thickness in a range from 0.5 mm to 25 mm. Any functional coating may be used on any surface of the plies of glazing material. For example, the functional coating may comprise a transparent conductive oxide or silver to provide properties of low emissivity and conduction of electricity.

A ply of interlayer material (13) may be a polymer. An example of a suitable polymer is polyvinyl butyral (PVB). Any thickness of the ply of interlayer material may be used. An example of a suitable thickness is in a range 0.38 mm to 0.76 mm. A second ply of interlayer (14) may be used. For example, each ply of interlayer material may have thickness 0.38 mm.

Use of the Invention

A glazing (10) comprising a conductive pattern sheet (1) according to the invention is also suitable in vehicles, buildings, refrigerator doors, white goods and digital signage to reduce optical distortion in heated glazing having more than one heating zone.

KEY TO THE DRAWINGS

1—Conductive pattern sheet
2—Substrate
3—Conductive pattern
4a, 4b—First and second busbars
5—Plurality of conductive lines
6—Portion of the plurality of conductive lines
7—Transition region
H1, H2—Height of line in first, second heating zone
L—Length of transition region
R1, R2, R3—Resistance per unit length of line in first, second, third heating zone
W1, W2, W3—Width of line in first, second, third heating zone
Z1, Z2, Z3—First, second, third heating zones
10—Glazing
11—First ply of glazing material
12—Second ply of glazing material
13—Ply of interlayer material
14—Second ply of interlayer material
20—Vehicle

The invention claimed is:

1. Conductive pattern sheet for use in a glazing, comprising:
   a) a substrate;
   b) a conductive pattern arranged on the substrate;
   wherein the conductive pattern comprises:
   c) first and second busbars arranged at opposing edges of the conductive pattern for connecting a power supply to the conductive pattern;
   d) a plurality of conductive lines each conductive line arranged between the first and second busbars;
   e) at least a portion of the plurality of conductive lines is configured to have a transition region wherein a change from a first resistance per unit length (R1) at a first end of the transition region to a second resistance per unit length (R2) at a second end of the transition region occurs over a predetermined length (L) of the transition region;
   f) wherein a rate of change of resistance per unit length (R1-R2)/L is from 1 to 16,000 ohms per centimetre squared and
   g) the substrate is a polymer sheet.

2. Conductive pattern sheet according to claim 1, wherein the conductive pattern comprises an etched conductive material.

3. Conductive pattern sheet according to claim 1, wherein the conductive line in the transition region comprises variable width or height or cross-sectional area or resistivity or a combination thereof.

4. Conductive pattern sheet according to claim 1, wherein the conductive line in the transition region has linear sides or curved sides or a combination thereof.

5. Conductive pattern sheet according to claim 1, wherein a rate of change of resistance per unit length in the transition region is linear or a parabolic function.

6. Conductive pattern sheet according to claim 5 wherein the rate of change of resistance per unit length is in a range from 3 to 15,000 ohms per centimetre squared.

7. Conductive pattern sheet according to claim 3, wherein a rate of change of the width or the height or the cross-sectional area or the resistivity of the conductive line in the transition region is linear or a parabolic function.

8. Conductive pattern sheet according to claim 7, wherein the rate of change of the width or the height is in a range from 1 to 540,000 μm per centimetre.

9. Conductive pattern sheet according to claim 1, wherein the predetermined length (L) is in a range from 1 to 10,000 µm.

10. Glazing comprising:
a first ply of glazing material;
a ply of interlayer material arranged on the first ply of glazing material;
a second ply of glazing material arranged on the ply of interlayer material;
a conductive pattern sheet according to claim 1 arranged between the ply of interlayer material and the second ply of glazing material.

11. Glazing according to claim 10, wherein a second ply of interlayer material is arranged between the conductive pattern sheet and the second ply of glazing material.

12. Vehicle comprising a glazing according to claim 10, wherein the transition region is in a vision zone of the glazing.

13. Method of manufacturing a conductive pattern sheet comprising:
a. providing a substrate;
b. arranging a conductive pattern on the substrate;
c. arranging first and second busbars at opposing edges of the conductive pattern for connecting a power supply to the conductive pattern;
d. arranging a plurality of conductive lines each conductive line between the first and second busbars; and
e. configuring at least a portion of the plurality of conductive lines to have a transition region wherein a change from a first resistance per unit length (R1) at a first end of the transition region to a second resistance per unit length (R2) at a second end of the transition region occurs over a predetermined length (L) of the transition region;
f. wherein a rate of change of resistance per unit length (R1-R2)/L is from 1 to 16,000 ohms per centimetre squared and
g. the substrate is a polymer sheet.

14. A method of manufacturing a conductive pattern sheet according to claim 13, further providing the portion of the plurality of conductive lines in the transition region with variable width or height or cross-sectional area or resistivity or a combination thereof.

15. A method of manufacturing a glazing, comprising:
a. providing a first ply of glazing material;
b. arranging a ply of interlayer material on the first ply of glazing material;
c. arranging a second ply of glazing material on the ply of interlayer material;
d. arranging a conductive pattern sheet according to claim 1 between the ply of interlayer material and the second ply of glazing material.

16. Conductive pattern sheet according to claim 5, wherein the rate of change of resistance per unit length is in a range from 5 to 12,000 ohms per centimetre squared.

17. Conductive pattern sheet according to claim 5, wherein the rate of change of resistance per unit length is in a range from 8 to 10,000 ohms per centimetre squared.

18. Conductive pattern sheet according to claim 7, wherein the rate of change of the width or the height is in a range from 10 to 65,000 µm per centimetre.

19. Conductive pattern sheet according to claim 1, wherein the predetermined length (L) is in a range from 10 to 5,000 µm.

20. Conductive pattern sheet according to claim 1, wherein the predetermined length (L) is in a range from 50 to 1,000 µm.

* * * * *